(12) United States Patent
Mouri et al.

(10) Patent No.: US 10,787,113 B2
(45) Date of Patent: Sep. 29, 2020

(54) VEHICLE FRONT HEADLIGHT DEVICE

(71) Applicants: Fumihiko Mouri, Owariasahi (JP); Takahiko Honda, Shizuoka (JP)

(72) Inventors: Fumihiko Mouri, Owariasahi (JP); Takahiko Honda, Shizuoka (JP)

(73) Assignees: TOYOTA JIDOSHA KABUSHIKI KAISHA, Toyota-shi (JP); KOITO MANUFACTURING CO., LTD., Minato-ku (JP)

( * ) Notice: Subject to any disclaimer, the term of this patent is extended or adjusted under 35 U.S.C. 154(b) by 0 days.

(21) Appl. No.: 16/372,825

(22) Filed: Apr. 2, 2019

(65) Prior Publication Data

US 2019/0351816 A1 Nov. 21, 2019

(30) Foreign Application Priority Data

May 18, 2018 (JP) ................. 2018-096044

(51) Int. Cl.
*B60Q 1/04* (2006.01)
*G02B 27/09* (2006.01)
(Continued)

(52) U.S. Cl.
CPC .............. *B60Q 1/04* (2013.01); *B60Q 1/085* (2013.01); *F21S 41/25* (2018.01); *F21S 41/675* (2018.01);
(Continued)

(58) Field of Classification Search
CPC .. G06K 9/00825; G06K 9/00805; B60Q 1/04; B60Q 1/08; B60Q 1/085;
(Continued)

(56) References Cited

U.S. PATENT DOCUMENTS

| 2013/0038736 A1 | 2/2013 | Yamamura | |
|---|---|---|---|
| 2014/0042325 A1* | 2/2014 | Yamamura | F21S 41/675 250/347 |

(Continued)

FOREIGN PATENT DOCUMENTS

| DE | 103 21 564 A1 | 12/2004 |
|---|---|---|
| DE | 10 2017 218 777 A1 | 4/2018 |

(Continued)

*Primary Examiner* — Alan B Cariaso
(74) *Attorney, Agent, or Firm* — Oblon, McClelland, Maier & Neustadt, L.L.P.

(57) ABSTRACT

A vehicle front headlight device includes a light source, a rotating mirror configured by a plurality of mirror bodies, that are rotationally driven about a shaft, and, while rotating, reflecting light emitted by the light source, a lens transmitting light that is reflected by the rotating mirror, a recognition unit configured to recognize a leading vehicle traveling ahead, and a controller controlling a timing at which the light source is switched off and a timing at which the light source is switched on, such that light is not illuminated onto the leading vehicle recognized by the recognition unit and such that an illumination intensity of light illuminated in a vicinity of both ends in a vehicle width direction of the leading vehicle is lower than an illumination intensity of light illuminated at an outer side of the vicinity of the both ends in the vehicle width direction of the leading vehicle.

7 Claims, 8 Drawing Sheets

(51) Int. Cl.
 *G06K 9/00* (2006.01)
 *F21S 41/25* (2018.01)
 *B60Q 1/08* (2006.01)
 *F21S 41/675* (2018.01)

(52) U.S. Cl.
 CPC ..... *G02B 27/0955* (2013.01); *G02B 27/0977* (2013.01); *G06K 9/00805* (2013.01)

(58) Field of Classification Search
 CPC .... F21S 41/25; F21S 41/675; G02B 27/0955; G02B 27/0977
 See application file for complete search history.

(56) References Cited

U.S. PATENT DOCUMENTS

| | | | |
|---|---|---|---|
| 2017/0159903 A1 | 6/2017 | Yamamura | |
| 2017/0159904 A1 | 6/2017 | Yamamura | |
| 2017/0185855 A1 | 6/2017 | Yamamura | |
| 2018/0112845 A1 | 4/2018 | Tanaka et al. | |
| 2018/0290583 A1* | 10/2018 | Park | B60Q 1/1423 |
| 2018/0332680 A1* | 11/2018 | Ichikawa | F21S 41/336 |
| 2018/0372303 A1* | 12/2018 | Na | F21V 14/003 |

FOREIGN PATENT DOCUMENTS

| | | |
|---|---|---|
| EP | 3 061 653 A1 | 8/2016 |
| JP | 5722882 | 5/2015 |

\* cited by examiner

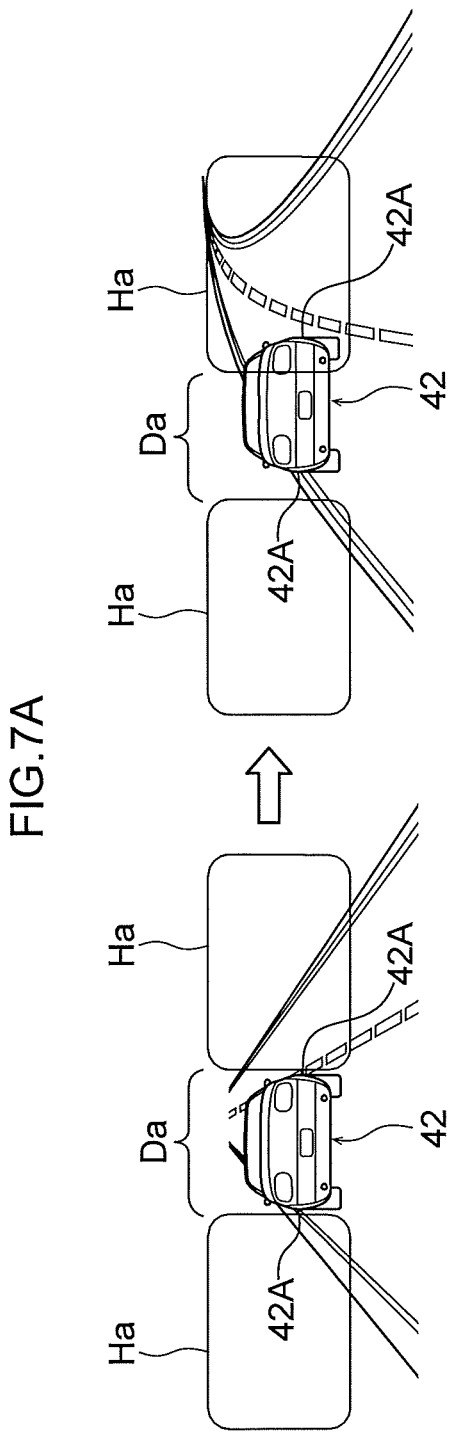

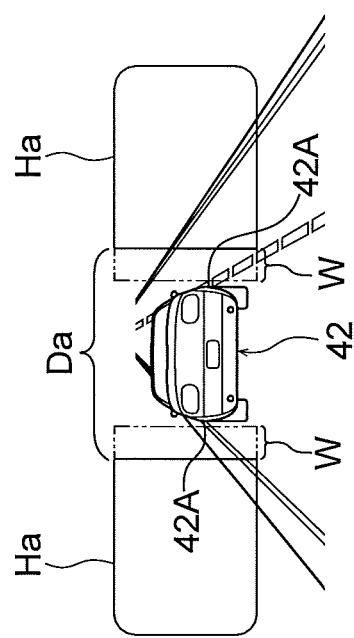

VEHICLE FRONT HEADLIGHT DEVICE

CROSS-REFERENCE TO RELATED APPLICATION

This application claims priority under 35 USC 119 from Japanese Patent Application No. 2018-096044 filed May 18, 2018, the disclosure of which is incorporated by reference herein in its entirety.

BACKGROUND

Technical Field

The present disclosure relates to a vehicle front headlight device.

Related Art

Optical units have been proposed in which a rotating mirror is capable of changing a high beam light distribution area (see Japanese Patent No. 5722882). Such optical units are capable of forming a shaded region, such that when there is a vehicle traveling ahead (also referred to as a "leading vehicle" hereafter), a high beam is not illuminated onto the leading vehicle.

SUMMARY

However, if a high beam light distribution area of the optical unit is set such that the high beam is illuminated as far as both ends in a vehicle width direction (vehicle width direction outermost edges) of the leading vehicle and a width of the shaded region is narrowed in order to improve the ability of a vehicle driver to see ahead of the vehicle, when the leading vehicle moves toward the left or right when traveling around a curve, the high beam illuminates onto the leading vehicle, dazzling the driver and so on of the leading vehicle.

As a countermeasure to this, if the high beam light distribution area were set such that the high beam was only illuminated as far as positions separated by a predetermined width toward a vehicle width direction outer side from the both ends in the vehicle width direction of the leading vehicle (if a margin were provided at the both ends in the vehicle width direction of the leading vehicle so as to widen a width of the shaded region), the ability of the vehicle driver to see ahead of the vehicle would be reduced.

The present disclosure obtains a vehicle front headlight device capable of suppressing the driver and so on of a leading vehicle from being dazzled, and also capable of suppressing a reduction in the ability of a vehicle driver to see ahead of the vehicle.

A vehicle front headlight device of a first aspect of the present disclosure includes a light source, a rotating mirror, a lens, a recognition unit, and a controller. The light source is configured to emit light. The rotating mirror is configured by plural mirror bodies, that are inclined with respect to an axial direction of a shaft, that are disposed around a circumferential direction of the shaft so as to be capable of being rotationally driven about the shaft, and the rotating mirror rotates while reflecting light emitted by the light source. The lens transmits light reflected by the rotating mirror so as to shine the light forward. The recognition unit is configured to recognize a leading vehicle traveling ahead. The controller controls rotational drive of the rotating mirror, and controls a timing at which the light source is switched off and a timing at which the light source is switched on, such that light is not illuminated onto the leading vehicle recognized by the recognition unit and such that an illumination intensity of light illuminated in a vicinity of both ends in a vehicle width direction of the leading vehicle is lower than an illumination intensity of light illuminated at a vehicle width direction outer side of the vicinity of the both ends in the vehicle width direction of the leading vehicle.

In the vehicle front headlight device of the first aspect, the controller controls rotational drive of the rotating mirror and controls the timing at which the light source is switched off and the timing at which the light source is switched on, such that light is not illuminated onto the leading vehicle traveling ahead, and such that the illumination intensity of light illuminated in the vicinity of the both ends in the vehicle width direction of the leading vehicle is lower than the illumination intensity of light illuminated at the vehicle width direction outer side of the vicinity of the both ends in the vehicle width direction of the leading vehicle. Accordingly, even if part of the light illuminated in the vicinity of the vehicle width direction ends of the leading vehicle falls on the leading vehicle when the leading vehicle moves toward the left or right when traveling around a curve, the illumination intensity of the light is low, enabling the driver and so on of the leading vehicle to be suppressed from being dazzled.

Despite the lower illumination intensity, light can be illuminated as far as the both ends in the vehicle width direction of the leading vehicle, thereby enabling a reduction in the ability of the vehicle driver to see ahead of the vehicle to be suppressed. The "vicinity of the both ends in the vehicle width direction of the leading vehicle" refers to a range of no greater than 1 meter toward the vehicle width direction outer side from the ends.

A vehicle front headlight device of a second aspect of the present disclosure is the vehicle front headlight device of the first aspect, wherein the controller controls so as to change the timing at which the light source is switched off and to change the timing at which the light source is switched on at each revolution of the rotating mirror.

In the vehicle front headlight device of the second aspect, the controller controls so as to change the timing at which the light source is switched off and to change the timing at which the light source is switched on at each revolution of the rotating mirror. This enables the illumination intensity of the light illuminated in the vicinity of the both ends in the vehicle width direction of the leading vehicle to be appropriately reduced. This thereby enables the driver and so on of the leading vehicle to be effectively suppressed from being dazzled, and enables a reduction in the ability of the vehicle driver to see ahead of the vehicle to be appropriately suppressed.

A vehicle front headlight device of a third aspect of the present disclosure is the vehicle front headlight device of the second aspect, wherein the controller adjusts so as to change the timing at which the light source is switched off and adjusts so as to change the timing at which the light source is switched on according to a distance to the leading vehicle recognized by the recognition unit.

In the vehicle front headlight device of the third aspect, the controller adjusts so as to change the timing at which the light source is switched off and adjusts so as to change the timing at which the light source is switched on according to a distance to the leading vehicle recognized by the recognition unit. This thereby enables the driver and so on of the leading vehicle to be more effectively suppressed from being dazzled, and enables a reduction in the ability of the vehicle driver to see ahead of the vehicle to be more appropriately suppressed than in cases in which the timing at which the light source is switched off and the timing at which the light source is switched on is constant, irrespective of the distance to the leading vehicle.

A vehicle front headlight device of a fourth aspect of the present disclosure is the vehicle front headlight device of either the second aspect or the third aspect, wherein the controller adjusts so as to change the timing at which the light source is switched off and adjusts so as to change the timing at which the light source is switched on according to a route found by a car navigation system.

In the vehicle front headlight device of the fourth aspect, the controller adjusts so as to change the timing at which the light source is switched off and adjusts so as to change the timing at which the light source is switched on according to the route found by the car navigation system. This thereby enables the driver and so on of the leading vehicle to be more effectively suppressed from being dazzled than in cases in which the timing at which the light source is switched off and the timing at which the light source is switched on is constant, irrespective of the route of the vehicle.

A vehicle front headlight device of a fifth aspect of the present disclosure is the vehicle front headlight device of any one of the second aspect to the fourth aspect, wherein the controller adjusts so as to change the timing at which the light source is switched off and adjusts so as to change the timing at which the light source is switched on according to weather information detected by a surrounding environment detection device.

In the vehicle front headlight device of the fifth aspect, the controller adjusts so as to change the timing at which the light source is switched off and adjusts so as to change the timing at which the light source is switched on according to weather information detected by the surrounding environment detection device. This thereby enables a reduction in the ability of the vehicle driver to see ahead of the vehicle to be more appropriately suppressed than in cases in which the timing at which the light source is switched off and the timing at which the light source is switched on is constant, irrespective of the weather information (weather conditions).

The vehicle front headlight device of the first aspect enables the driver and so on of the leading vehicle to be suppressed from being dazzled, and enables a reduction in the ability of the vehicle driver to see ahead of the vehicle to be suppressed.

The vehicle front headlight devices of the second aspect and the third aspect enable the driver and so on of the leading vehicle to be effectively suppressed from being dazzled, and enable a reduction in the ability of the vehicle driver to see ahead of the vehicle to be appropriately suppressed.

The vehicle front headlight device of the fourth aspect enables the driver and so on of the leading vehicle to be effectively suppressed from being dazzled.

The vehicle front headlight device of the fifth aspect enables a reduction in the ability of the vehicle driver to see ahead of the vehicle to be appropriately suppressed.

BRIEF DESCRIPTION OF THE DRAWINGS

Exemplary embodiments will be described in detail based on the following figures, wherein:

FIG. 7A is an explanatory diagram illustrating a high beam light distribution area of a vehicle front headlight device according to a comparative example when a leading vehicle transitions from traveling in straight line to traveling around a curve; and FIG. 7B is an explanatory diagram illustrating a high beam light distribution area of a vehicle front headlight device according to a comparative example in which a margin is provided at both sides in a vehicle width direction of a leading vehicle.

DETAILED DESCRIPTION

Figure 1:
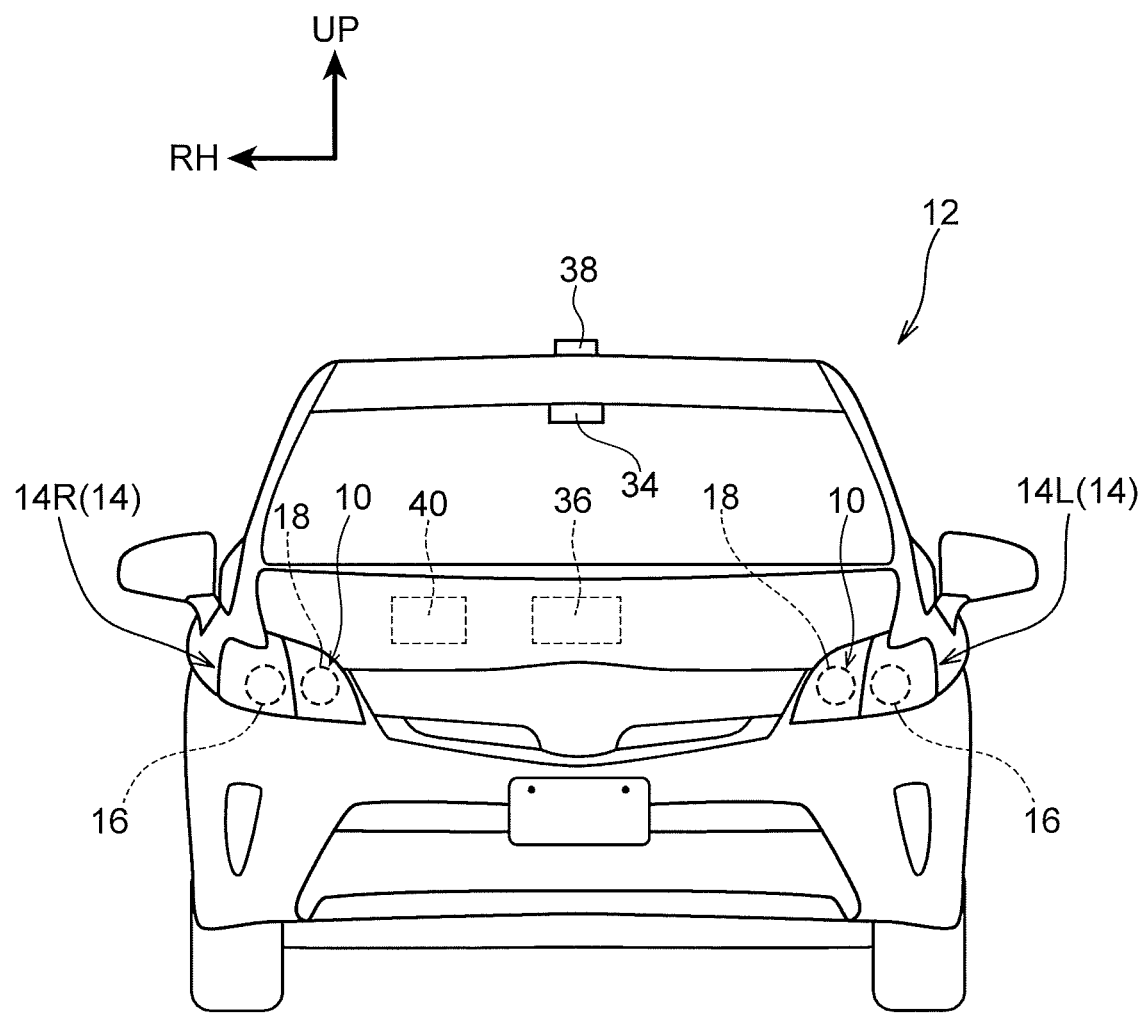
FIG. 1 is a front view illustrating a vehicle provided with a vehicle front headlight device according to an exemplary embodiment.

Detailed explanation follows regarding exemplary embodiments of the present invention, with reference to the drawings. To assist explanation, in the drawings the arrow UP indicates a vehicle upward direction, the arrow FR indicates a vehicle forward direction, and the arrow RH indicates a vehicle right direction, as appropriate. In the following explanation, unless indicated otherwise, reference to up, down, front, rear, left, and right directions refers to up and down in a vehicle vertical direction, front and rear in a vehicle front-rear direction, and left and right in a vehicle left-right direction (vehicle width direction).

As illustrated in FIG. 1, a vehicle 12 is provided with a pair of left and right headlamp units 14 to secure the field of view ahead of the vehicle 12. Namely, a headlamp unit 14R is disposed on the right of a front end section of the vehicle 12, and a headlamp unit 14L is disposed on the left of the front end section of the vehicle 12.

The headlamp units 14R, 14L are configured with left-right symmetry to each other in the vehicle width direction, and are each configured including a low beam unit 16 disposed at a vehicle width direction outer side, and a high beam unit 18 disposed at a vehicle width direction inner side. The low beam units 16 each illuminates visible light through a lens (not illustrated in the drawings) onto a low beam light distribution area (not illustrated in the drawings) on the road (road surface) ahead of the vehicle 12.

The high beam units 18 each illuminates visible light through a lens 32, described later, onto a high beam light distribution area Ha (see FIG. 4, FIG. 5, etc.) higher up and further ahead than the low beam light distribution area illuminated by the low beam units 16. Note that a vehicle front headlight device 10 according to respective exemplary embodiments is applied to the high beam units 18.

First Exemplary Embodiment

Figure 2:
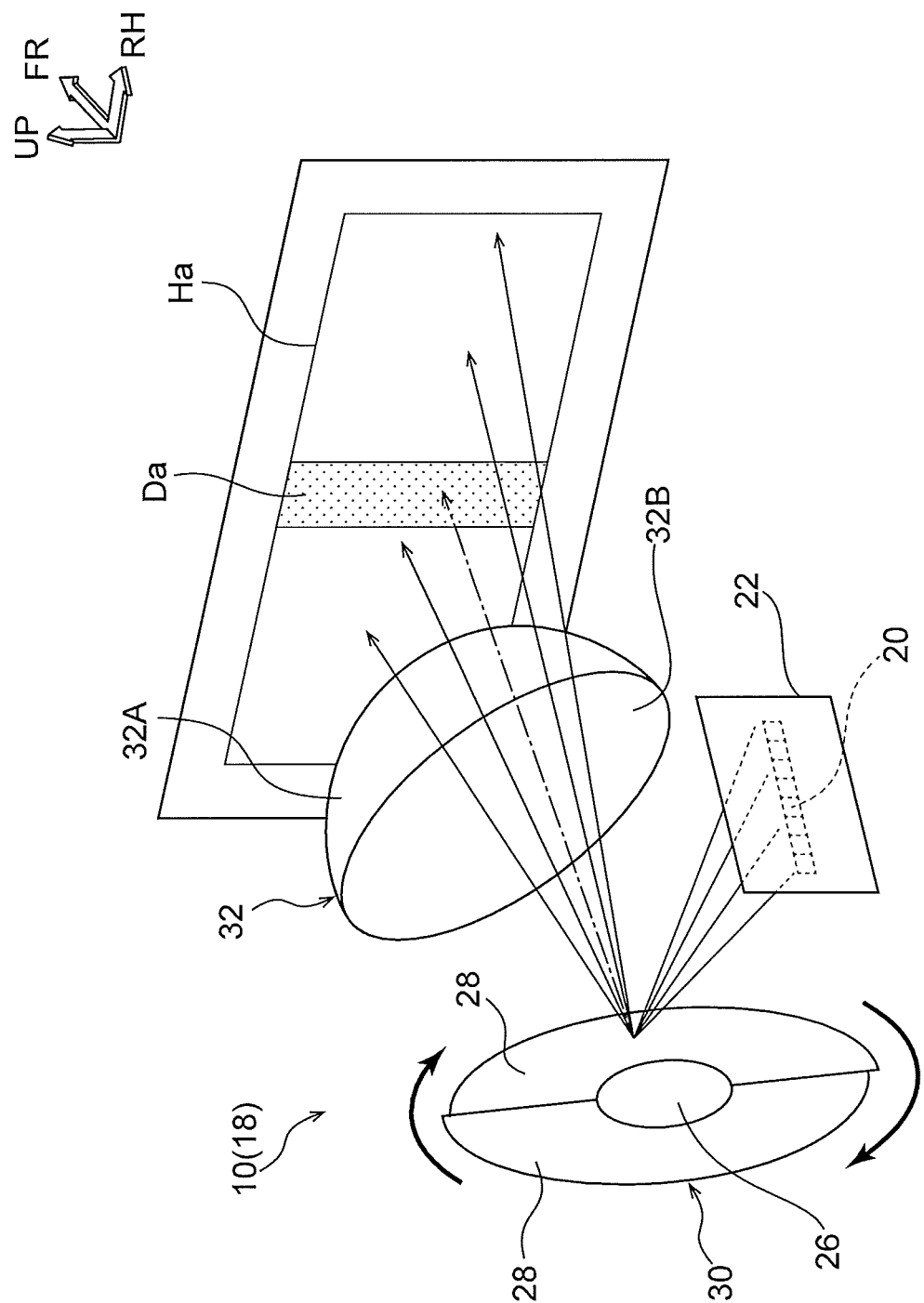
FIG. 2 is a schematic perspective view illustrating a vehicle front headlight device according to an exemplary embodiment.
Figure 3:
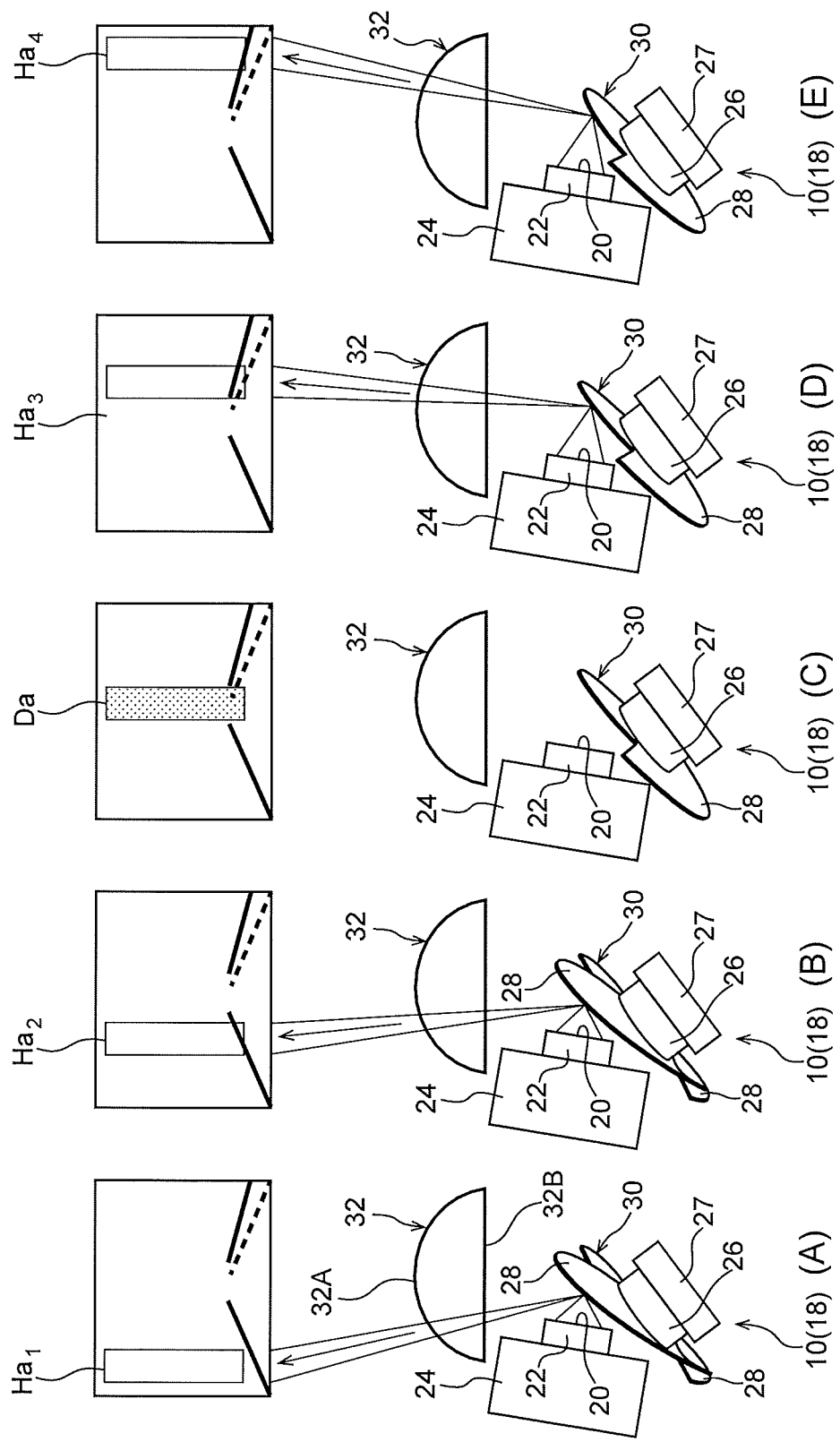
FIG. 3 is an explanatory diagram illustrating a sequence of illuminated regions at predetermined different points in time when a rotating mirror undergoes one revolution in a vehicle front headlight device according to an exemplary embodiment.
Figure 4:
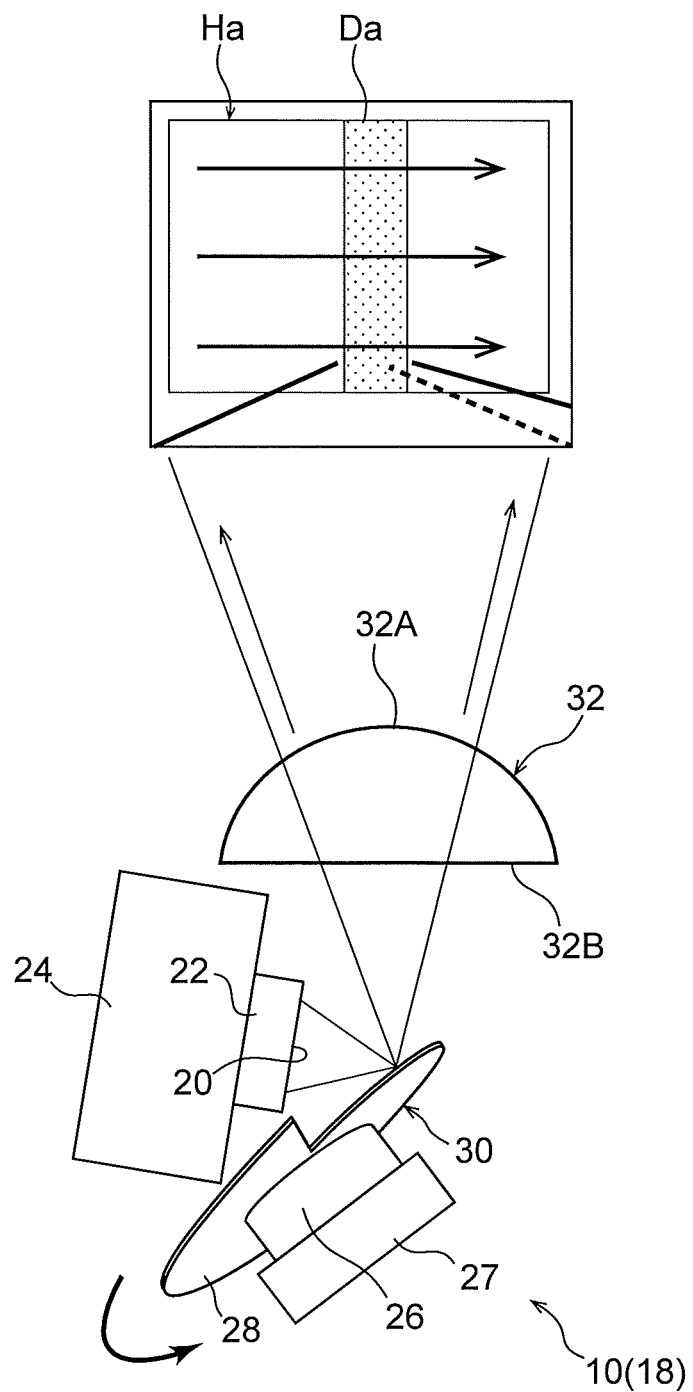
FIG. 4 is an explanatory diagram illustrating a high beam light distribution area formed by a rotating mirror of a vehicle front headlight device according to an exemplary embodiment.

As illustrated in FIG. 2 to FIG. 4, the high beam units 18 applied with the vehicle front headlight device 10 according to a first exemplary embodiment each includes a light source 20 that emits visible light, a rotating mirror 30 that reflects the visible light emitted from the light source 20, and a single lens 32 that transmits the visible light reflected by the rotating mirror 30 and illuminates (projects) the visible light ahead (to the exterior of) the vehicle 12.

The light source 20 is configured by plural (for example, eight) light emitting diodes (LEDs) arranged on a substrate 22 so as to form a single row with no gaps present between the LEDs. The substrate 22 is disposed on a heat sink 24 (see FIGS. 3 and FIG. 4). The light source 20 (the respective LEDs) is electrically connected to a controller 40 (see FIG. 1), and the light source 20 is switched off and on not only by switch operation by a driver, but also under the control of the controller 40.

A front surface of the lens 32 is configured by a projecting semispherical curved surface 32A. A rear surface of the lens 32 is configured by a flat surface 32B. Visible light that has been reflected by the rotating mirror 30 and incident to the rear surface (flat surface 32B) of the lens 32 passes through the lens 32 and is radiated ahead of the vehicle from the front surface (curved surface 32A) of the lens 32. In the interests of simplicity, diffraction of the light by the lens 32 is not illustrated in FIGS. 3 and FIG. 4. The rear surface of the lens 32 is not limited to the flat surface 32B.

The rotating mirror 30 is configured by plural mirror bodies 28 (for example, two substantially semicircular mirror bodies 28 as viewed along an axial direction of a shaft 26) inclined at a predetermined angle (for example, an angle of 45°) with respect to the axial direction of the shaft 26, and disposed at uniform intervals around a circumferential direction of the shaft 26. The rotating mirror 30 is capable of being rotationally driven in one direction about the shaft 26.

Namely, the rotating mirror 30 has a fan-like structure in which the shaft 26 is rotationally driven in the one direction by a motor 27. The motor 27 is electrically connected to the controller 40, and the rotating mirror 30 is rotationally driven under the control of the controller 40.

Explanation follows regarding the high beam light distribution area Ha formed by light reflected by the rotating mirror 30.

As illustrated in (A) of FIG. 3, an illuminated region $Ha_1$ is formed by reflected light that is a visible light emitted from the light source 20 and reflected by the mirror bodies 28 when allocated at a predetermined first stationary position, for example. The illuminated region $Ha_1$ has a rectangular shape with its length direction in the vertical direction, and is formed at a predetermined position at a left end ahead of the vehicle 12.

As illustrated in (B) of FIG. 3, an illuminated region $Ha_2$ is formed by reflected light that is light emitted from the light source 20 and reflected by the mirror bodies 28 when allocated at a second stationary position in a state rotated by for example 72° from the first stationary position. The illuminated region $Ha_2$ has a rectangular shape with its length direction in the vertical direction, and is formed at a position shifted toward a center from the predetermined position at the left end ahead of the vehicle 12.

As illustrated in (C) of FIG. 3, the light source 20 is switched off and light is not illuminated by the mirror bodies 28 when allocated at a third stationary position in a state rotated by a further 72° from the second stationary position (144° from the first stationary position). A dark area Da is thereby formed as a shaded region where light is not illuminated in the high beam light distribution area Ha. A timing at which the light source 20 is switched off in the vicinity of the third stationary position and a timing at which the light source 20 is subsequently switched on again will be described in detail later.

As illustrated in (D) of FIG. 3, an illuminated region $Ha_3$ is formed by reflected light that is light emitted from the light source 20 and reflected by the mirror bodies 28 when allocated at a fourth stationary position in a state rotated by a further 72° from the third stationary position (216° from the first stationary position). The illuminated region $Ha_3$ has a rectangular shape with its length direction in the vertical direction, and is formed at a position shifted toward a right end from the central position ahead of the vehicle 12.

As illustrated in (E) of FIG. 3, an illuminated region $Ha_4$ is formed by reflected light that is light emitted from the light source 20 and reflected by the mirror bodies 28 when allocated at a fifth stationary position in a state rotated by a further 72° from the fourth stationary position (288° from the first stationary position). The illuminated region $Ha_4$ has a rectangular shape with its length direction in the vertical direction, and is formed at a predetermined position at the right end ahead of the vehicle 12.

When the mirror bodies 28 are rotated by a further 72° from the fifth stationary position (360° from the first stationary position), the mirror bodies 28 return to the first stationary position and stop. The illuminated region formed by light reflected by the mirror bodies 28 in this state is therefore the same as that illustrated in (A) of FIG. 3. Namely, over a single revolution of the rotating mirror 30, a rectangular shaped illuminated region with its length direction in the vertical direction is shifted as $Ha_1$, $Ha_2$, $Ha_3$, and $Ha_4$ along the vehicle width direction from one end to the other end (from the left to the right).

Accordingly, by continuously rotating the rotating mirror 30 at a predetermined speed or greater (for example at 200 Hz), there are consecutive high-speed shifts along the vehicle width direction from the one end to the other end (from the left to the right) through the illuminated regions $Ha_1$, $Ha_2$, $Ha_3$, and $Ha_4$. Thus, as illustrated in FIG. 4, to the human eye, the high beam light distribution area Ha appears as a substantially rectangular shape with its length direction in the vehicle width direction and with only a substantially central portion in the vehicle width direction not illuminated (the dark area Da only formed at the substantially central portion in the vehicle width direction), due to the afterimage effect of the light.

Figure 5:
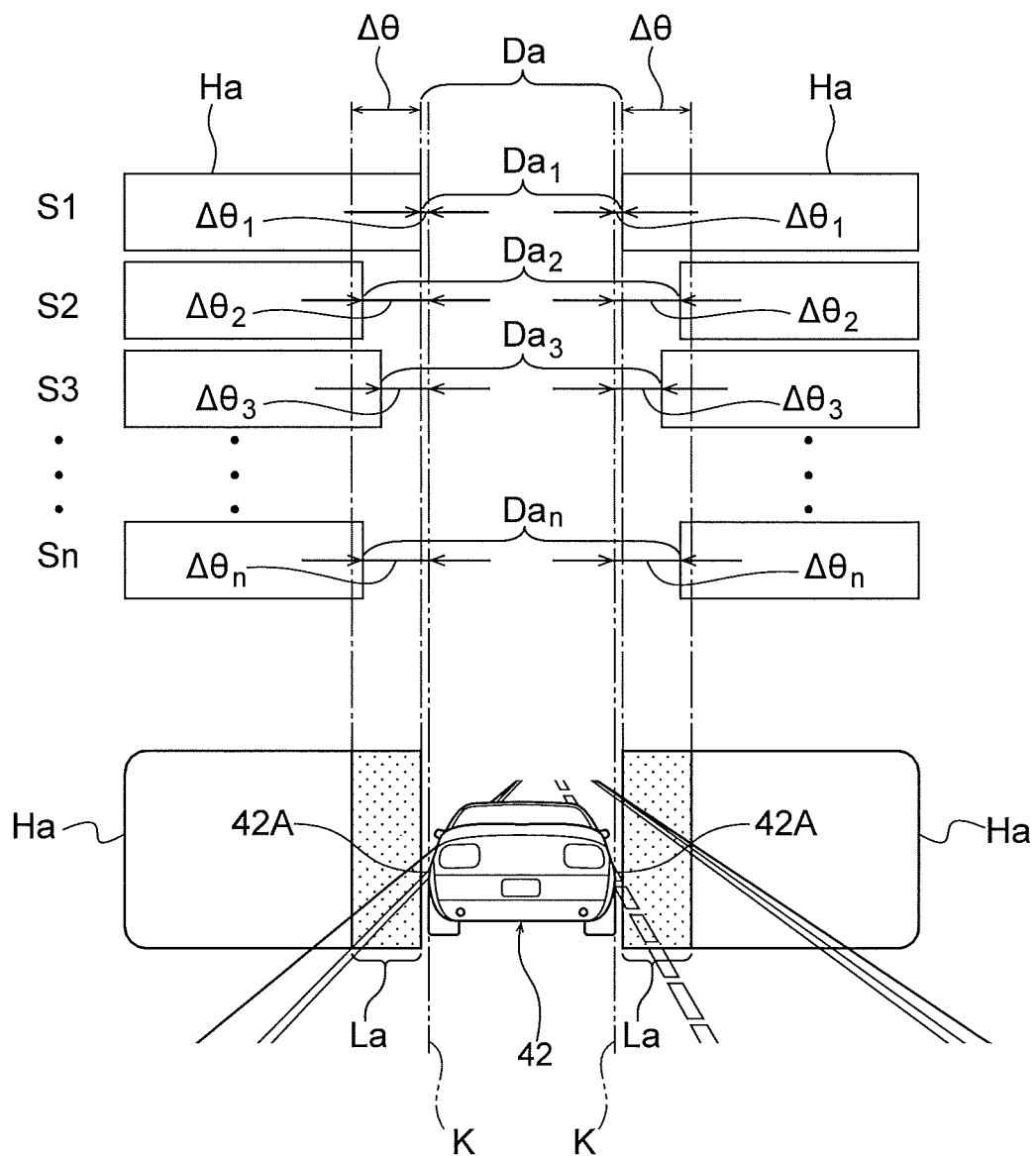
FIG. 5 is an explanatory diagram illustrating staggered timings for switching a light source on and staggered timings for switching the light source off toward a high beam light distribution area formed by a rotating mirror of a vehicle front headlight device according to an exemplary embodiment.
Figure 6:
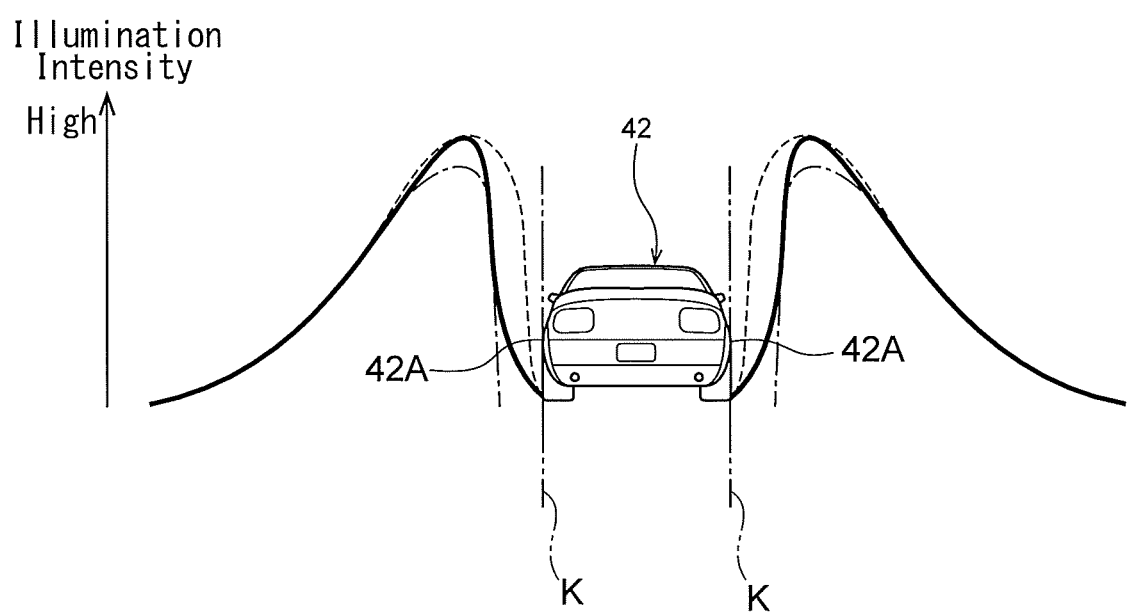
FIG. 6 is an explanatory diagram illustrating an illumination intensity of light illuminated in the vicinity of both ends in a vehicle width direction of a leading vehicle by a vehicle front headlight device according to an exemplary embodiment.

Next, explanation follows regarding the timing at which the light source 20 is switched off to form the dark area Da illustrated in (C) of FIG. 3 and the timing at which the light source 20 is subsequently switched on again. In FIG. 5 and FIG. 6, tangents passing in a perpendicular direction through both ends 42A in a vehicle width direction of a leading vehicle 42 are indicated by imaginary lines K.

As illustrated in FIG. 5, in the vicinity of the third stationary position (within a range of 144°±a few degrees from the first stationary position) of the rotating mirror 30, the controller 40 controls so as to change the timing at which the light source 20 is switched off and to change the timing at which the light source 20 is switched on at each revolution (each cycle) of the rotating mirror 30.

More specifically, on a first revolution (S1) of the rotating mirror 30, the high beam is illuminated as far as positions very close to the both ends 42A in the vehicle width direction (imaginary lines K) of the leading vehicle 42 traveling ahead, namely positions separated from the ends 42A by a narrow width Δθ1 to the vehicle width direction outer side from the ends 42A of the leading vehicle 42. The timing to switch off and the timing to switch on the light source 20 are thus controlled to produce a minimum width dark area Da1.

Then, on a second revolution of the rotating mirror 30 (S2), the high beam is illuminated as far as positions separated from the ends 42A (imaginary lines K) by a predetermined width Δθ2 to the vehicle width direction outer side from the both ends 42A of the leading vehicle 42. The timing to switch off and the timing to switch on the light source 20 are thus controlled to produce a maximum width dark area Da2.

Namely, the timing at which the light source 20 is switched off during the second revolution of the rotating mirror 30 is earlier than the timing at which the light source 20 is switched off during the first revolution (for example the light source 20 is switched off at the timing at which the rotation angle of the mirror body 28 is 1° smaller than during the first revolution). The timing at which the light source 20 is switched on during the second revolution of the rotating mirror 30 is later than the timing at which the light source 20 is switched on during the first revolution (for example the light source 20 is switched on at the timing at which the rotation angle of the mirror body 28 is 1° greater than during the first revolution).

On a third revolution of the rotating mirror 30 (S3), the high beam is illuminated as far as positions separated from the ends 42A (imaginary lines K) by a width Δθ3 to the vehicle width direction outer side from the both ends 42A of the leading vehicle 42. The width Δθ3 is greater than the width Δθ1 and smaller than the width Δθ2. The timing to switch off and the timing to switch on the light source 20 are thus controlled so as to produce a dark area Da3 with a width size that is partway between the dark area Da1 and the dark area Da2.

Namely, the timing at which the light source 20 is switched off during the third revolution of the rotating mirror 30 is later than the timing at which the light source 20 is switched off during the second revolution and earlier than the timing at which the light source 20 is switched off during the first revolution (for example the light source 20 is switched off at a timing when the rotation angle of the mirror body 28 is 0.5° smaller than during the first revolution), so as to be a timing that is partway between the timing at which the light source 20 is switched off during the first revolution and the timing at which the light source 20 is switched off during the second revolution.

The timing at which the light source 20 is switched on during the third revolution of the rotating mirror 30 is later than the timing at which the light source 20 is switched on during the first revolution and earlier than the timing at which the light source 20 is switched on during the second revolution (for example the light source 20 is switched on at a timing when the rotation angle of the mirror body 28 is 0.5° greater than during the first revolution), so as to be a timing that is partway between the timing at which the light source 20 is switched on during the first revolution and the timing at which the light source 20 is switched on during the second revolution.

Then, during a fourth revolution of the rotating mirror 30, for example, the timing at which the light source 20 is switched off and the timing at which the light source 20 is switched on are controlled similarly to during the first revolution of the rotating mirror 30. During a fifth revolution of the rotating mirror 30, for example, the timing at which the light source 20 is switched off and the timing at which the light source 20 is switched on are controlled similarly to during the second revolution of the rotating mirror 30. During a sixth revolution of the rotating mirror 30, for example, the timing at which the light source 20 is switched off and the timing at which the light source 20 is switched on are controlled similarly to during the third revolution of the rotating mirror 30.

By repeating this control, as illustrated in FIG. 5, the illumination intensity of the light illuminated in the vicinity of the both ends 42A in the vehicle width direction of the leading vehicle 42 is lower than the illumination intensity of the light illuminated further toward the vehicle width direction outer side. Namely, low illumination intensity areas La where the illumination intensity is low enough not to dazzle a person are formed in the vicinity of the both ends 42A in the vehicle width direction of the leading vehicle 42 (on both sides of the dark area Da that is ultimately formed).

In FIG. 6, illumination intensity distribution in the low illumination intensity areas La is illustrated by solid lines. As illustrated in FIG. 6, the illumination intensity distribution in the low illumination intensity areas La formed by the vehicle front headlight device 10 according to the present exemplary embodiment is an illumination intensity distribution that is substantially midway between an illumination intensity distribution (illustrated by dashed lines) when light is illuminated as far as the both ends 42A in the vehicle width direction of the leading vehicle 42, and an illumination intensity distribution (illustrated by single-dotted dashed lines) when light is only illuminated as far as positions separated from the ends 42A by a predetermined width toward the vehicle width direction outer side from the both ends 42A of the leading vehicle 42.

Taking a width of the respective low illumination intensity areas La as Δθ, a width Δθn between respective vehicle width direction outer side ends of a dark area during an nth revolution (Sn), which is referred to as a dark area Dan, and each of both ends 42A in the vehicle width direction (imaginary lines K) of the leading vehicle 42 can be set using the Equation Δθn=Δθ×Rn/N (Rn: an integer from 0 to N, N: the number of increments). The "vicinity of the both ends 42A in the vehicle width direction of the leading vehicle 42" refers to a range of no greater than 1 meter toward the vehicle width direction outer side from the ends 42A, for example.

The leading vehicle 42 is recognized by a recognition unit 34 (see FIG. 1) configured by a camera, sensor, or the like that is electrically connected to the controller 40. The controller 40 adjusts so as to change the timing at which the light source 20 is switched off and the timing at which the light source 20 is switched on (a width of the dark areas Da) according to a distance to the leading vehicle 42 (the position of the leading vehicle 42 relative to the vehicle 12) recognized by the recognition unit 34.

The controller 40 also adjusts so as to change the timing at which the light source 20 is switched off and the timing at which the light source 20 is switched on (a width of the dark areas Da) according to a route found using a car navigation system 36 (see FIG. 1) (for example according to the number of curves), and weather information (weather conditions such as fine weather or wet weather) detected by a surrounding environment detection device 38 (see FIG. 1) including a weather sensor and the like.

Explanation follows regarding operation of the vehicle front headlight device 10 according to the present exemplary embodiment configured as described above.

When the vehicle 12 is traveling at night and so on, the high beam is switched on as required. Namely, the driver operates a switch to drive rotation of the rotating mirror 30 and switch on the light source 20, or the controller 40 drives rotation of the rotating mirror 30 and switches on the light source 20 based on, for example, position information recognized by the recognition unit 34, route information found by the car navigation system 36, or weather information detected by the surrounding environment detection device 38 provided to the vehicle 12.

When this is performed, visible light emitted from the light source 20 is reflected by the rotationally driven rotating mirror 30 (mirror bodies 28), passes through the lens 32, and is illuminated ahead of the vehicle. The high precision high beam light distribution area Ha is thus formed, higher up and further ahead than the low beam light distribution area. The dark area Da is also formed in the high beam light distribution area Ha.

Namely, the dark area Da in which the high beam is not illuminated onto the leading vehicle 42 is set such that the driver and so on of the leading vehicle 42 traveling ahead are not dazzled. Specifically, for example, the timing at which the light source 20 is switched off and the timing at which the light source 20 is switched on are controlled by the controller 40 such that the light source 20 is temporarily switched off in the vicinity of the third stationary position of the rotating mirror 30.

By contrast, if, as in the comparative example illustrated in FIG. 7A, the dark area Da were to be set with a narrow width and the high beam were to be illuminated as far as both ends 42A in a vehicle width direction of the leading vehicle 42 when traveling along a straight road, when the leading vehicle 42 travels around a curve, part of the high beam would fall on the leading vehicle 42, which could dazzle the driver and so on of the leading vehicle 42.

If, as a countermeasure, a width of the dark area Da were set wider as in the comparative example illustrated in FIG. 7B, such that the high beam were only illuminated as far as positions separated from the ends 42A by a predetermined width W to a vehicle width direction outer side from the ends 42A of the leading vehicle 42 (if margins with the width W were provided), this could decrease the ability of the driver of the vehicle 12 to see ahead of the vehicle (including the leading vehicle 42).

As illustrated in FIG. 5, in the vehicle front headlight device 10 according to the present exemplary embodiment, are formed in parts of the high beam light distribution area Ha in the vicinity of the both ends 42A in the vehicle width direction of the leading vehicle 42. Namely, as described above, the controller 40 controls so as to change the timing at which the light source 20 is switched off and to change the timing at which the light source 20 is switched on at each revolution of the rotating mirror 30. Accordingly, the illumination intensity of light illuminated in the vicinity of the ends 42A in the vehicle width direction of the leading vehicle 42 is lower than the illumination intensity of light illuminated further toward the vehicle width direction outer side.

Accordingly, even if part of the light (high beam) illuminated from the high beam unit 18 (vehicle front headlight device 10) falls on the leading vehicle 42 when the leading vehicle 42 moves toward the left or right when transitioning from traveling in a straight line to traveling around a curve, the illumination intensity of the light illuminated onto the leading vehicle 42 is low, enabling the driver and so on of the leading vehicle 42 to be suppressed from being dazzled. Despite the lower illumination intensity, light can be illuminated as far as the ends 42A of the leading vehicle 42, thereby decreasing or preventing a reduction in the ability of the driver of the vehicle 12 to see ahead of the vehicle.

Moreover, in the vehicle front headlight device 10 according to the present exemplary embodiment, the controller 40 controls so as to change the timing at which the light source 20 is switched off and to change the timing at which the light source 20 is switched on at each revolution of the rotating mirror 30, thereby reducing the illumination intensity of the light illuminated in the vicinity of the both ends 42A of the leading vehicle 42 appropriately. This thereby decreases or prevents the driver and so on of the leading vehicle 42 from being dazzled, and decreases or prevents a reduction in the ability of the driver of the vehicle 12 to see ahead of the vehicle.

In the vehicle front headlight device 10 according to the present exemplary embodiment, the controller 40 is capable of adjusting so as to change the timing at which the light source 20 is switched off and the timing at which the light source 20 is switched on (a width of the dark areas Da) whereby a width of the low illumination intensity areas La is adjusted according to the distance to the leading vehicle 42 (the position of the leading vehicle 42 relative to the vehicle 12) recognized by the recognition unit 34.

This thereby enables the driver and so on of the leading vehicle 42 to be more effectively suppressed from being dazzled, and decreases or prevents a reduction in the ability of the driver of the vehicle 12 to see ahead of the vehicle more effectively than in cases in which the width of the low illumination intensity areas La is constant, irrespective of the distance to the leading vehicle 42 (the position of the leading vehicle 42 relative to the vehicle 12).

In the vehicle front headlight device 10 according to the present exemplary embodiment, the controller 40 is capable of adjusting so as to change the timing at which the light source 20 is switched off and the timing at which the light source 20 is switched on (a width of the dark areas Da) whereby a width of the low illumination intensity areas La is adjusted according to the route found by the car navigation system 36. This thereby enables the driver and so on of the leading vehicle 42 to be more effectively suppressed from being dazzled than in cases in which the width of the low illumination intensity areas La is constant, irrespective of the route of the vehicle 12.

More specifically, for example, the timing at which the light source 20 is switched off is set earlier and the timing at which the light source 20 is switched on is set later overall when turning tight curves (curves having a small radius of curvature) than when turning gentle curves (curves having a large radius of curvature), enabling a width of the low illumination intensity areas La to be made wider. This thereby enables the driver and so on of the leading vehicle 42 to be effectively suppressed from being dazzled when traveling around tight curves.

In the vehicle front headlight device 10 according to the present exemplary embodiment, the controller 40 is also capable of adjusting so as to change the timing at which the light source 20 is switched off and the timing at which the light source 20 is switched on (a width of the dark areas Da) whereby a width of the low illumination intensity areas La is adjusted according to the weather conditions (weather information) detected by the surrounding environment detection device 38. This thereby decreases or prevents a reduction in the ability of the driver of the vehicle 12 to see ahead of the vehicle more appropriately than in cases in which the width of the low illumination intensity areas La is constant, irrespective of the weather conditions.

More specifically, in wet weather for example, the timing at which the light source 20 is switched off is set later and the timing at which the light source 20 is switched on is set earlier overall than in fine weather, enabling a width of the low illumination intensity areas La to be made narrower. This thereby decreases or prevents a reduction in the ability of the driver of the vehicle 12 to see ahead of the vehicle appropriately. Namely, the field of view of the driver of the vehicle 12 ahead of the vehicle can be well-secured, even in wet weather.

The vehicle front headlight device 10 according to the present exemplary embodiment has been explained above with reference to the drawings. However, the vehicle front headlight device 10 according to the present exemplary embodiment is not limited to that illustrated in the drawings, and various design modifications may be implemented within a range not departing from the scope of the present disclosure. For example, a width of the Dark areas Da may be set to a constant preset width (without being adjusted for weather conditions and so on). Moreover, the number of the mirror bodies 28 is not limited to two, and there is no limitation to angling the mirror bodies 28 to 45° with respect to the shaft 26.

There is no limitation to shifting the rectangular shaped illuminated regions $Ha_1$ to $Ha_4$ (see FIGS. 3) every time the rotating mirror 30 rotates by 72°. Namely, the rotation angle of the rotating mirror 30 used to shift rectangular shaped illuminated regions is set as appropriate according to the number of the mirror bodies 28 and the angle of the mirror bodies 28 with respect to the shaft 26.

There is no limitation to applying the vehicle front headlight device 10 according to the present exemplary embodiment to the high beam unit 18. For example, the vehicle front headlight device 10 according to the present exemplary embodiment may be provided at a headlamp unit 14 provided separately to the high beam unit 18 and the low beam unit 16.

What is claimed is:

1. A vehicle front headlight device comprising:
    a light source configured to emit light;
    a rotating mirror configured by a plurality of mirror bodies, that are inclined with respect to an axial direction of a shaft, that are disposed around a circumferential direction of the shaft, and that are rotationally driven about the shaft, and, while rotating, reflecting light emitted by the light source;
    a lens transmitting light that is reflected by the rotating mirror so as to radiate the light forward;
    a recognition unit configured to recognize a leading vehicle traveling ahead; and
    a controller controlling rotational drive of the rotating mirror, and controlling a timing at which the light source is switched off and a timing at which the light source is switched on at each revolution of the rotating mirror in a repeating pattern, such that light is not illuminated onto the leading vehicle recognized by the recognition unit and such that an illumination intensity of light illuminated in a vicinity of both ends of the leading vehicle in a vehicle width direction of the leading vehicle is lower than an illumination intensity of light illuminated at an outer side of the vicinity of the both ends in the vehicle width direction of the leading vehicle,
    wherein the repeating pattern includes
        a first revolution of the rotating mirror in which the light is separated from the both ends of the leading vehicle by a first predetermined width,
        a second revolution of the rotating mirror in which the light is separated from the both ends of the leading vehicle by a second predetermined width, and
        a third revolution of the rotating mirror in which the light is separated from the both ends of the leading vehicle by a third predetermined width, and
    wherein the third predetermined width is greater that the first predetermined width and less than the second predetermined width.

2. The vehicle front headlight device of claim 1, wherein the controller adjusts so as to change the timing at which the light source is switched off and adjusts so as to change the timing at which the light source is switched on according to a distance to the leading vehicle recognized by the recognition unit.

3. The vehicle front headlight device of claim 1, wherein the controller adjusts so as to change the timing at which the light source is switched off and adjusts so as to change the timing at which the light source is switched on according to a route found by a car navigation system.

4. The vehicle front headlight device of claim 2, wherein the controller adjusts so as to change the timing at which the light source is switched off and adjusts so as to change the timing at which the light source is switched on according to a route found by a car navigation system.

5. The vehicle front headlight device of claim 1, wherein the controller adjusts so as to change the timing at which the light source is switched off and adjusts so as to change the timing at which the light source is switched on according to weather information detected by a surrounding environment detection device.

6. The vehicle front headlight device of claim 2, wherein the controller adjusts so as to change the timing at which the light source is switched off and adjusts so as to change the timing at which the light source is switched on according to weather information detected by a surrounding environment detection device.

7. The vehicle front headlight device of claim 3, wherein the controller adjusts so as to change the timing at which the light source is switched off and adjusts so as to change the timing at which the light source is switched on according to weather information detected by a surrounding environment detection device.

* * * * *